June 9, 1925.
H. L. PELZER ET AL
1,541,068
PROCESS FOR THE MANUFACTURE OF ALUMINUM CHLORIDE
Filed Jan. 15, 1923
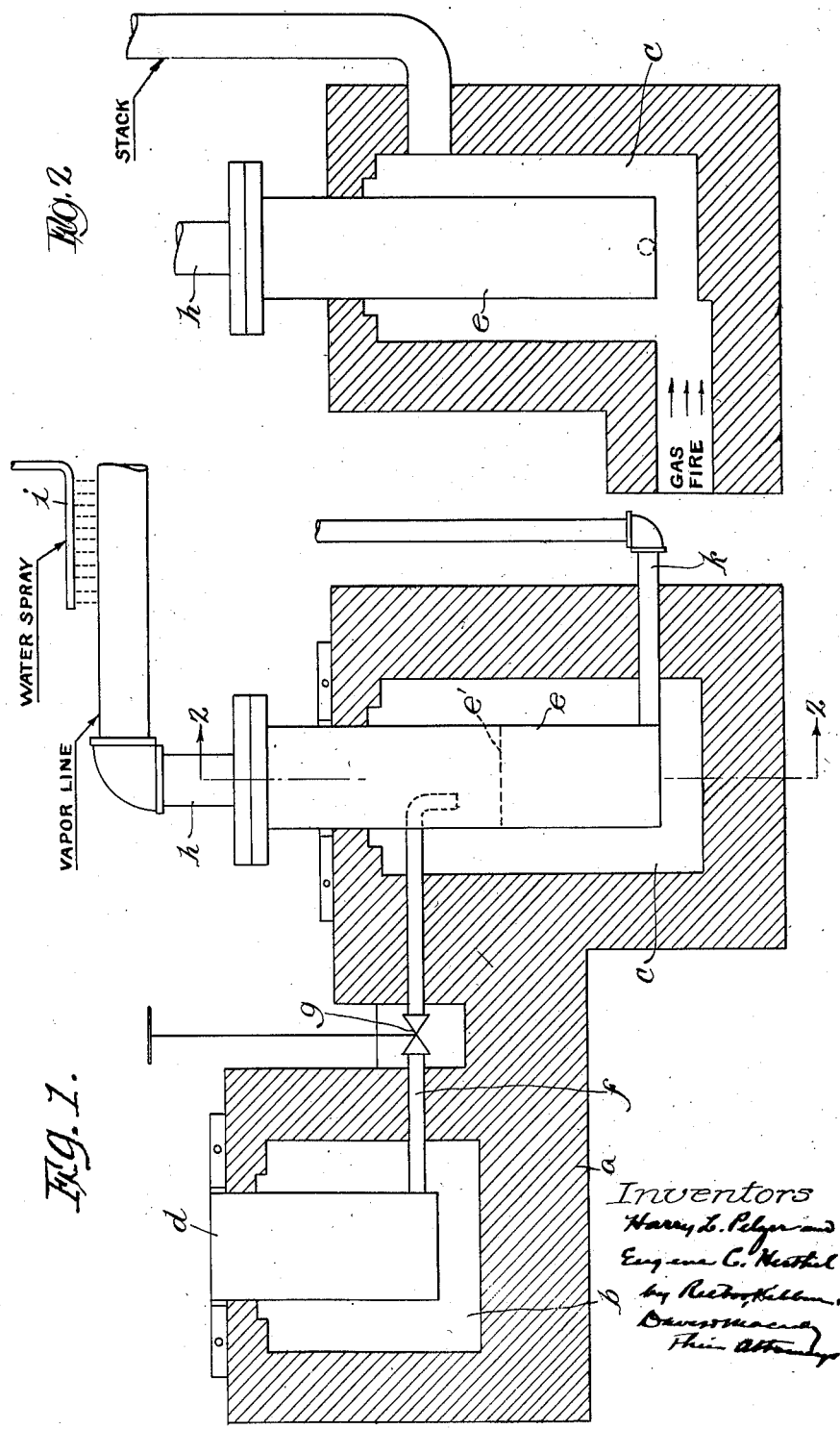

Patented June 9, 1925.

1,541,068

UNITED STATES PATENT OFFICE.

HARRY L. PELZER AND EUGENE C. HERTHEL, OF CHICAGO, ILLINOIS.

PROCESS FOR THE MANUFACTURE OF ALUMINUM CHLORIDE.

Application filed January 15, 1923. Serial No. 612,791.

*To all whom it may concern:*

Be it known that we, HARRY L. PELZER and EUGENE C. HERTHEL, citizens of the United States, residing at Chicago, in the county of Cook and State of Illinois, have invented certain new and useful Improvements in Processes for the Manufacture of Aluminum Chloride, of which the following is a specification.

Our invention particularly has in view the manufacture of anhydrous aluminum chloride for the purpose of gasoline manufacture. It has long been known that if the higher petroleum hydrocarbons, such as those constituting gas or fuel oil, be heated to a suitable temperature in the presence of aluminum chloride they are largely converted into lower boiling point hydrocarbons, such as those which constitute commercial gasoline. Where the cracking takes place in the presence of aluminum chloride the resulting cracked distillate contains a lower proportion of unsaturated hydrocarbons, many of which are undesirable in commercial gasoline because of their unpleasant odor, tendency to form gummy oxidation products, etc. Furthermore by cracking in the presence of aluminum chloride, the high temperatures and pressures essential for commercial operation where cracking is performed without the presence of a catalytic agent with their attendant disadvantages, may be dispensed with. Nothwithstanding the generally acknowledged advantages of the employment of aluminum chloride in the process, it has never made substantial headway against the high temperature, high pressure cracking process mainly because of the high cost of aluminum chloride. While the material seems to act purely as a catalytic agent, it must be employed in considerable quantities and soon becomes "poisoned" or neutral requiring replacement in the process. It has been proposed to regenerate the aluminum chloride and use it over again but the regeneration processes so far proposed have been too expensive for practical use.

It is the purpose of the present invention to improve the process of manufacturing aluminum chloride whereby the anhydrous salt will be available for the purpose of cracking petroleum and other uses at a reduced cost.

Our invention consists primarily in heating aluminum in the presence of the chloride of a metal having a less affinity for chlorin at the temperature employed than aluminum. Among such metals may be mentioned lead, zinc, copper, bismuth, mercury, and iron. The reaction is one of direct replacement of the metal of the chloride by aluminum and takes place at a temperature above the point of volatilization of aluminum chloride so that the latter compound as it is formed is volatilized, driven out, condensed and collected. The metal of the original chloride, freed from chlorin, may collect in the bottom of the reaction chamber in metallic form and be drawn off during or after the reaction if desired while still fluid.

Preferably we employ a chloride in a molten condition and it is therefore desirable to use a chloride which is liquid and will react with aluminum at a moderate furnace temperature but which will not volatilize to an objectionable extent at the reaction temperature. We have found lead and zinc chlorides to be especially well adapted for the purpose because they are molten and their vapor pressures are not excessive at the temperatures which it is necessary or desirable to employ. Preferably the temperature of reaction should be one at which the aluminum chloride formed is volatile so that it at once vaporizes and may be carried away from the zone of reaction and condensed. If a chloride of higher melting point such as cadmium chloride is used, the reaction should be conducted at a correspondingly higher temperature. It is, of course, necessary, in order to start the reaction, that the aluminum and chloride, or either of them be heated to or above the reaction temperature. A relatively small portion of either of the reacting materials can be raised to the critical temperature by applied heat and as the reaction is exothermic and self-propagating the entire body of material will gradually become involved. Preferably the chloride is melted and heated to the required temperature separately and then added to the aluminum which may or may not be previously heated. It is not essential that pure aluminum be used or that it be free from other metals or from oxidation products. Thus, borings or turnings of commercial aluminum may be used. If the aluminum is in excess any other metal commonly found in the commercial metal remains in metallic form because of the superior affinity of chlorin for aluminum. Nor is it essential that the chloride be pure. The commercial article may be used. Any moisture which may be present in the chloride or in the aluminum is driven off before the materials reach the reacting temperature.

As an illustration of our invention we give the following example in which zinc chloride is the salt used. The salt is heated to a temperature of approximately 900 degrees F. at which it is completely liquefied. Aluminum in small pieces, as for example in the form of turnings, is heated to approximately the same temperature and then the molten chloride is poured into the heated receptacle containing the aluminum. The aluminum and zinc chloride may be heated in separate chambers in the same furnace and then the melted chloride introduced into the chamber containing the aluminum, which chamber is provided with a pipe leading to a suitable condenser for leading away the vapors formed. The aluminum and chloride are brought together in approximately molecular quantities, a slight excess of the chloride being preferred. The reaction starts at once, the aluminum by reason of its superior affinity taking the chlorin from the zinc chloride, and as the temperature is above the point of volatilization of aluminum chloride, vapors of the latter are evolved which escape to a condenser. Suitable precaution must be taken to prevent access of air or moisture to the vapors. The zinc chloride is reduced to metallic zinc. The reaction is exothermic and the temperature usually rises at least as high as 1100 degrees F., at which temperature the zinc formed is in a molten condition and may be drawn off or permitted to cool in the chamber. Either the chloride or the aluminum may be introduced cold or the two may be mixed together cold and then heated to the reacting temperature.

Any simple form of apparatus in which the materials may be brought together and heated and which provides for leading off the vapors formed and condensing them without access of moisture may be employed for carrying out our process. In the drawings accompanying and forming a part of this specification, Figure 1 is a longitudinal vertical section; and Fig. 2 a vertical cross section of an apparatus which we have found suitable for the purpose. In said drawings, a furnace is shown which is provided with two heating chambers $b$ and $c$ the chamber $b$ being arranged at a slightly higher level than the chamber $c$. The chambers are shown as separate and may be separately fired though this is not essential. In the upper chamber $b$ is a pot $d$ for heating the chloride and a pot $e$ is located in chamber $c$ for heating the aluminum and conducting the reaction. A pipe $f$ leads from pot $d$ to the pot $e$ for the purpose of conducting molten chloride from the former to the latter and a hand controlled valve $g$ in the pipe serves to control communication. The pot $e$ which is somewhat larger than pot $d$ is closed at the top save for a vapor line $h$ which leads to a condenser. The condenser is shown as water cooled by a spray $i$. A pipe $k$ is shown for drawing off metal reduced from the chloride if desired.

In operation, the pot or shell $e$ is filled to the level of the dotted line $e'$ with small pieces of aluminum, turnings, borings, or the like, and zinc, lead or other suitable chloride in a quantity somewhat in excess of molecular requirements is heated in the pot $d$ to about the reaction temperature, the salt preferably being heated to about 900° F. The valve $g$ is then opened to permit the molten chloride to flow into the reaction chamber $e$. The above given reaction then takes place without the supply of additional heat during the progress thereof and as the temperature is above that of vaporization of aluminum chloride this product in vaporous form is carried off by the vapor line and condensed without access of moisture or outside air.

The above described process for the production of aluminum chloride is economical in the respect that it is necessary only to supply sufficient heat to start the reaction which thereafter is exothermic and self-propagating. The economical efficiency of the reaction is almost theoretically perfect and even though impurities may be present in either the aluminum or the chloride they do not materially affect the result, as the product sought, aluminum chloride, separates by volatilization. Any chlorides carried over with the vapors of aluminum chloride may be readily separated therefrom by condensation and any metallic impurities formed alloys with the zinc or other metal constituting the principal metal of the chloride.

Furthermore, the reaction may be employed to advantage for obtaining certain metals from their ores. Thus for example lean ores of lead may be leached and converted into the chloride by known processes and the chloride reduced by aluminum, thus obtaining two valuable products, to-wit, metallic lead and aluminum chloride. The process is also applicable for the recovery of zinc and other metals from their ores.

We claim:

1. A process for the production of aluminum chloride which consists in heating aluminum in the presence of the chloride of a metal having a less affinity for chlorin than aluminum at high temperatures to a reacting temperature and separating the aluminum chloride formed from the residue.

2. A process of manufacturing aluminum chloride which consists in heating aluminum and the chloride of a metal having a less affinity for chlorin at high temperatures than aluminum to a temperature at which the aluminum chloride is volatile thereby forming aluminum chloride vapors and condensing the vapors as they are formed.

3. A process for the manufacture of aluminum chloride which consists in heating aluminum and the choride of a metal having a less affinity for chlorin at high temperatures than aluminum to a reacting temperature, permitting the reaction to continue by the heat of the reaction thereby driving off aluminum chloride as it is formed in vaporous condition and condensing it.

4. A process for the manufacture of aluminum chloride which consists in melting the chloride of a metal having a less affinity for chlorin than aluminum at high temperatures, bringing the chloride and aluminum into contact with each other at a reacting temperature and separating the aluminum chloride formed.

5. A process for the manufacture of aluminum chloride which consists in melting a chloride of a metal having a less affinity for chlorin than aluminum, bringing the molten chloride into contact with aluminum at a temperature at which the salt and metal react upon each other and at which aluminum chloride is volatile, driving off the aluminum chloride vapors and condensing them.

6. A process for the manufacture of aluminum chloride which consists in bringing aluminum into contact with the chloride of a metal having a less affinity for chlorin than aluminum at a temperature at which aluminum chloride is volatile, volatilizing the aluminum chloride formed and condensing it.

7. A process for the production of aluminum chloride which consists in melting the chloride of a metal having less affinity for chlorine the aluminum, bringing it into contact with aluminum, raising the temperature to a point at which reaction takes place but at which the chloride is non-volatile, driving off vapors of chloride of aluminum and condensing them.

8. A process for the manufacture of aluminum chloride which consists in heating zinc chloride to a temperature at which aluminum chloride is volatile, mixing the chloride with aluminum, vaporizing the aluminum chloride formed and condensing it.

HARRY L. PELZER.
EUGENE C. HERTHEL.